US011205821B2

(12) United States Patent
Sun et al.

(10) Patent No.: US 11,205,821 B2
(45) Date of Patent: Dec. 21, 2021

(54) METHOD FOR PREPARING AROMATIC POLYAMIDE POROUS MEMBRANE AND AROMATIC POLYAMIDE POROUS MEMBRANE PREPARED THEREBY

(71) Applicant: Microvast Power Systems Co., Ltd., Huzhou (CN)

(72) Inventors: Qingjin Sun, Huzhou (CN); Dawei Shen, Huzhou (CN); Zuliang Shen, Huzhou (CN); Hui Wu, Huzhou (CN); Xiang Li, Huzhou (CN)

(73) Assignee: MICROVAST POWER SYSTEMS CO., LTD., Huzhou (CN)

( * ) Notice: Subject to any disclaimer, the term of this patent is extended or adjusted under 35 U.S.C. 154(b) by 224 days.

(21) Appl. No.: 16/082,269

(22) PCT Filed: Jan. 5, 2017

(86) PCT No.: PCT/CN2017/070270
§ 371 (c)(1),
(2) Date: Sep. 4, 2018

(87) PCT Pub. No.: WO2017/133375
PCT Pub. Date: Aug. 10, 2017

(65) Prior Publication Data
US 2019/0097196 A1   Mar. 28, 2019

(30) Foreign Application Priority Data
Feb. 3, 2016   (CN) .......................... 201610075690.6

(51) Int. Cl.
*H01M 50/403*   (2021.01)
*B01D 71/56*   (2006.01)
(Continued)

(52) U.S. Cl.
CPC .......... *H01M 50/403* (2021.01); *B01D 67/00* (2013.01); *B01D 67/0016* (2013.01);
(Continued)

(58) Field of Classification Search
CPC ............ H01M 10/0525; H01M 50/403; B01D 67/00; B01D 67/0016; B01D 67/0095; B01D 71/56
See application file for complete search history.

(56) References Cited

U.S. PATENT DOCUMENTS

| 4,627,992 A | 12/1986 | Badenhop et al. |
| 5,362,582 A * | 11/1994 | Chang .................. H01M 2/14 |
| | | 429/249 |

(Continued)

FOREIGN PATENT DOCUMENTS

| CN | 101935398 A | 1/2011 |
| CN | 101970555 A | 2/2011 |

(Continued)

OTHER PUBLICATIONS

M. A. Kraus, M. Nemas, M. A. Frommer, "The Effect of Low Molecular Weight Additives on the Properties of Aromatic Polyamide Membranes", Journal of Applied Polymer Science, 1979, pp. 445-452, vol. No. 23, John Wiley & Sons, Inc.

*Primary Examiner* — Karie O'Neill Apicella
(74) *Attorney, Agent, or Firm* — Cheng-Ju Chiang

(57) ABSTRACT

The present invention provides a method for preparing an aromatic polyamide porous membrane and an aromatic polyamide porous membrane prepared by the above method. The method for preparing an aromatic polyamide porous membrane includes the following steps: mixing an ionic liquid with an aromatic polyamide into a solvent to form a mixed solution; the mixed solution forming a membrane in a coagulation bath; and extracting with an extractant to remove the solvent and the ionic liquid from the membrane (Continued)

to yield a porous membrane. In the method of the present invention, the application of the ionic liquid would greatly reduce the application of additives; further, the ionic liquid has a high stability and is easy to be separated from other solvents and be recycled, which assures the safety during the usage and recycle thereof.

16 Claims, 1 Drawing Sheet

(51) Int. Cl.
  *B01D 67/00*   (2006.01)
  *H01M 10/0525*   (2010.01)
  *H01M 50/446*   (2021.01)

(52) U.S. Cl.
  CPC ......... *B01D 67/0095* (2013.01); *B01D 71/56* (2013.01); *H01M 10/0525* (2013.01); *H01M 50/446* (2021.01)

(56) References Cited

U.S. PATENT DOCUMENTS

2010/0310853 A1* 12/2010 Schwiegk ............ B29C 67/202
                  428/314.4
2012/0302678 A1  11/2012 Baek et al.

FOREIGN PATENT DOCUMENTS

| CN | 102299376 A | 12/2011 |
| CN | 202384420 A | 8/2012 |
| CN | 103242556 A | 8/2013 |
| CN | 103665403 A | 3/2014 |
| EP | 1233036 A1 | 8/2002 |
| EP | 1537906 A1 | 6/2005 |
| EP | 1849821 A1 | 10/2007 |
| WO | 2006/123811 A1 | 11/2006 |

* cited by examiner

METHOD FOR PREPARING AROMATIC POLYAMIDE POROUS MEMBRANE AND AROMATIC POLYAMIDE POROUS MEMBRANE PREPARED THEREBY

CROSS REFERENCE TO RELATED APPLICATIONS

This application is a 35 U.S.C. § 371 National Phase conversion of International (PCT) Patent Application No. PCT/CN2017/070270, filed on Jan. 5, 2017, which claims the priority of Chinese Patent Application No. 201610075690.6, filed on Feb. 3, 2016. The contents of the above-identified applications are incorporated herein by reference. The PCT International Patent Application was filed and published in Chinese.

FIELD OF THE INVENTION

The present disclosure relates to a method for preparing an aromatic polyamide porous membrane and an aromatic polyamide porous membrane prepared by the method above.

BACKGROUND OF THE INVENTION

Conventionally, porous membranes are prepared by thermally induced phase separation (TIPS) process or nonsolvent induced phase separation (NIPS) process. During the thermally induced phase separation process, crystallization performance of a thermoplastics polymer is utilized. In detail, under high temperature, the thermoplastics polymer, together with a diluent agent which has a high boiling point and low molecular-weight, forms a homogeneous casting solution; when temperature decreases, solid-liquid phase separation or liquid-liquid phase separation occurs. After that, the diluent agent is removed, thereby yields a polymer porous membrane. Meanwhile, as to the nonsolvent induced phase separation process, the polymer porous membrane is prepared during a polymer solution, which has a continuous phase solvent system transforms into a continuous phase three-dimensional macromolecular network gel. Both processes mentioned above have the following disadvantages: various additives such as porogen or solvents would be added into the polymer, because of this, a great number of extractive solvents are needed; meanwhile, the separation of the additives are complex, and the additives are hard to be recycled. All the above leads to high production cost and environmental pollution.

The separator of a lithium battery is just a kind of such porous membranes, which is one of the key components in the lithium battery industry. With the rapid development of the lithium battery industry, demands for separator have increased dramatically. The separator is located between an anode and a cathode of the battery, used to separate the anode from the cathode. In this way, the internal short circuit of the battery is avoided thereby, at the same time, lithium ions could pass through the separator smoothly during charging and discharging. Currently, it is melt-stretched polyolefin separator that is widely used in lithium batteries. Limited by the properties of polyolefin material itself, the working environment temperature of such separator could not be too high. However, at a high-rate charge-discharge working environment, battery internal temperature is prone to rise rapidly. For this reason, polyolefin separator is inclined to occur obturator or even heat-shrink, and battery inner resistance would be further significantly increased, which would eventually lead to battery failure. Aromatic polyamide polymers (such as PPTA, PMIA, PBA, PSA) have a high heat-resistance performance with a glass transition temperature of above 300° C. and thermal decomposition temperature up to 560° C. Besides, they also have high insulation performance and chemical erosion resistance. Because of these, aromatic polyamide polymers are good choices for lithium battery separator. In practice, aramid fibers have been applied in lithium battery separator, as described in Chinese Patent Publication Nos. CN103242556A and CN202384420U. As described therein, aromatic polyamide polymer fibers are coated on surfaces of polyolefin separator. However, limited by the properties of polyolefin material itself, application of such method has been greatly reduced.

SUMMARY OF THE INVENTION

To solve the problems above, the present disclosure provides a method for preparing an aromatic polyamide porous membrane. The method includes the following steps: mixing an ionic liquid with an aromatic polyamide into a solvent to form a mixed solution; the mixed solution forming a membrane in a coagulation bath; and extracting with an extractant to remove the solvent and the ionic liquid from the membrane to yield a porous membrane eventually.

The ionic liquid is a liquid substance, which is entirely comprised of the ionic composition. Since the ionic liquid remains liquid at room temperature or a lower temperature, it is described as a room temperature molten salt or a low-temperature molten salt or a liquid organic salt. There are many types of ionic liquids, and according to different organic cations, ionic liquids can be divided into quaternary ammonium salts, quaternary phosphonium salts, nitrogen heterocyclic onium salts, etc., for example, nitrogen heterocyclic typed ionic liquids include imidazolium onium salts, pyridinium onium salts, piperidinium salts, pyrrolidine salts, etc. Structures of cations of several common ionic liquids are as follows:

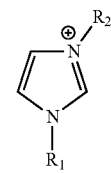
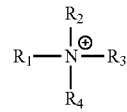

imidazolium onium cation    quaternary ammonium cation

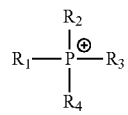
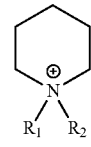

quaternary phosphonium cation    piperidinium cation

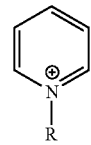

pyridinium onium cation

There are various types of anions which could constitute ionic liquids, wherein inorganic anions include: $F^-$, $Cl^-$, $Br^-$, $I^-$, $NO_3^-$, $CO_3^{2-}$, $PF_6^-$, $BF_4^-$, $C_2O_4^{2-}$, $SO_4^{2-}$, $PO_4^{3-}$, $Al_2Cl_7^-$, etc., while organic anions include: $CH_3COO^-$, $CF_3SO_3^-$, $C_4H_9SO_3^-$, $CF_3COO^-$, $N(FSO_2)_2^-$, $N(CF_3SO_2)_2^-$, $N(C_2F_5SO_2)_2^-$, $N(C_4F_9SO_2)_2$, $N[(CF_3SO_2)(C_4F_9SO_2)]^-$, $C(CF_3SO_2)_3^-$, etc.

In the present disclosure, the porous membrane is prepared by NIPS process. Compared with the TIPS process, NIPS doesn't require higher temperature during the whole process, and its process parameters are easier to be controlled. Further, three-dimensional mesh pore structures can be easier to yield in NIPS process. For the reasons above, NIPS process is widely applied in current porous membrane industries such as water treatment membrane, air separation membrane etc.

In the present disclosure, aromatic polyamide porous membranes are prepared under the following factors which cooperate with each other: one is to apply a NIPS process, and the other is to choose ionic liquids as pore-forming agent; further, the ionic liquids are chosen as the only additive, which has the following advantages: (1) As ionic substances, ionic liquids have properties of both salt and organics; because of this, ionic liquids have good dissolving ability. (2) Ionic liquids have better thermal stability and chemical stability. For example, the thermal decomposition temperature of most ionic liquids is higher than 400° C., which is greatly different from the boiling point of general solvents. Such difference helps the ionic liquids to separate from other solvents and to be recycled later. (3) Ionic liquids have no flash point and have high fire points, which could guarantee their safety during the usage and recycle thereof. In conclusion, compared with conventional, in the method of the present disclosure, the application of the ionic liquid would greatly reduce that of other additives; further, the ionic liquid has high stability and is easy to be separated from other solvents and be recycled, which assures the safety during the usage and recycle thereof.

During membrane preparation, a ratio of the ionic liquid to the aromatic polyamide can be adjusted according to the expected porosity of the membrane. In one embodiment, when a mass ratio of the ionic liquid to the aromatic polyamide is between 1:1 and 8:1, a membrane is yielded, which has uniformly-distributed pores therein and suitable porosity. In another embodiment, the mass ratio of the ionic liquid to the aromatic polyamide is between 1:1 and 6:1. In yet another embodiment, the mass ratio of the ionic liquid to the aromatic polyamide is between 2:1 and 5:1.

In an embodiment, the ionic liquid is at least one selected from the group consisting of quaternary ammonium salts, quaternary phosphonium salts, imidazolium onium salts, pyridinium onium salts, piperidinium salts and pyrrolidine salts. Such kind of ionic liquid is more easily to be dissolved in polar solvents and be prepared as an ionic liquid solution.

In one embodiment, the aromatic polyamide is at least one selected from the group consisting of poly(p-phenylene terephthalamide) (aramid fiber 1414, PPTA), poly (m-phenylene isophthalamide) (aramid fiber 1313, PMIA), polypbenzamide) (aramid fiber I, PBA) and polysulfone amide.

In the present disclosure, there is no limitation on how to prepare the mixed solution of ionic liquid and aramid. The preparation can be realized by one of the followings:

In one embodiment, a method for preparing the mixed solution thereof includes the following in detail: first, mixing an ionic liquid with a first solvent to form an ionic liquid solution; second, mixing an aromatic polyamide with a second solvent to form an aromatic polyamide solution; finally, mixing the ionic liquid solution with the aromatic polyamide solution to yield the mixed solution. The aromatic polyamide is an aromatic polyamide fiber. There is no limitation on the form of the aromatic polyamide fiber, for example, it is spun, fibrid, or other aromatic polyamide fibers commonly used in membrane preparation.

In another embodiment, a method for preparing the mixed solution thereof includes the following in detail: first, mixing an ionic liquid with a first solvent to form an ionic liquid solution; second, forming an aromatic polyamide solution through a polymerization, wherein a second solvent is applied during the polymerization; finally, mixing the ionic liquid solution with the aromatic polyamide solution to yield the mixed solution. There is no limitation to the implementation of the polymerization, for example, it can be implemented in a twin-screw extruder or a reaction kettle.

In yet another embodiment, a method for preparing the mixed solution thereof includes the following in detail: mixing an ionic liquid, an aromatic polyamide and a third solvent to yield the mixed solution. In an embodiment, the aromatic polyamide is an aromatic polyamide fiber. There is no limitation on the forms of the aromatic polyamide fibers, for example, it can be spun, fibrid, or other aromatic polyamide fibers commonly used in membrane preparation.

In the present disclosure, the first solvent refers to a solvent which can dissolve the ionic liquid; the second solvent refers to a solvent which can dissolve the aromatic polyamide; and the third solvent refers to a solvent which can dissolve both the ionic liquid and the aromatic polyamide. There are no limitation on specific components of the first, second and third solvents.

In the present disclosure, the first solvent refers to a solvent which can dissolve the ionic liquid. In one embodiment, the first solvent is at least one selected from the following: water, ethanol, propanol, isopropanol, glycerol, tetrahydrofuran, pyridine, dichloromethane, trichloromethane, ethyl acetate, N,N-dimethyl formamide, N,N-dimethyl acetamide, N-methyl pyrrolidone and polyethylene glycol.

In the present disclosure, the second solvent refers to a solvent which can dissolve the aromatic polyamide. In one embodiment, the second solvent is at least one selected from the following: N-methyl pyrrolidone (NMP), N,N-dimethyl acetamide (DMAC), N,N-dimethyl formamide (DMF), dimethyl sulfoxide (DMSO) and triethyl phosphate (TEP).

In one embodiment, a mass ratio of the first solvent to the ionic liquid is between 0.05:1 and 0.8:1. In another embodiment, the mass ratio of the first solvent to the ionic liquid is between 0.1:1 and 0.5:1.

In one embodiment, a mass ratio of the second solvent to the aromatic polyamide is between 2:1 and 10:1. In another embodiment, the mass ratio of the second solvent to the aromatic polyamide is between 3:1 and 8:1.

In the present disclosure, the third solvent refers to a solvent which can dissolve both the ionic liquid and the aromatic polyamide. In one embodiment, the third solvent is at least one selected from below: N-methyl pyrrolidone, N,N-dimethyl acetamide, N,N-dimethyl formamide and dimethyl sulfoxide.

In one embodiment, a mass fraction of the third solvent in the mixed solution is 20-80%. In another embodiment, the mass fraction of the third solvent in the mixed solution is 40-70%.

In one embodiment, the coagulation bath includes a first component. The first component is water or dichloromethane. In another embodiment, the coagulation bath merely includes water or dichloromethane, that is, a mass fraction of water or dichloromethane in the coagulation bath is 100%.

In another embodiment, the coagulation bath further includes a second component. The second component is at least one selected from the following: N-methyl pyrrolidone, N,N-dimethyl acetamide, N,N-dimethyl formamide, dimethyl sulfoxide and triethyl phosphate. The second component herein is mainly selected from solvents which can dissolve aromatic polyamide. The choice of the solvent is different according to different preparation. For example, in an embodiment wherein the mixed solution is prepared by dissolving the ionic liquid and the aromatic polyamide separately and then mixing, the second component can be selected from the components of the second solvent mentioned above. For another example, certain kind of solvent which can dissolve both the ionic liquid and the aromatic polyamide is selected to prepare the mixed solution, the second component can be selected from the components of the third solvent mentioned above. The choice of the second component in the coagulation bath is in accordance with the solvent applied during the preparation of the aromatic polyamide solution. In an embodiment wherein N,N-dimethyl acetamide (DMAC) solvent is applied to prepare the aromatic polyamide solution, the components in the coagulation bath can be water, a combination of water and DMAC, dichloromethane, or a combination of dichloromethane and DMAC etc.

At the existence of other solvents, a mass fraction of water or dichloromethane in the coagulation bath is 5-99.9%. In one embodiment, the mass fraction of water or dichloromethane in the coagulation bath is 20-60%. In another embodiment, the mass fraction of water or dichloromethane in the coagulation bath is 30-50%.

In an embodiment, a temperature of the coagulation bath is 0-80° C. In another embodiment, the temperature of the coagulation bath is 20-60° C.

In the present disclosure, both the temperature of the coagulation bath and the concentration of the components in the coagulation bath all have a great effect on the structure of the yielded porous membrane. On one hand, the concentration of water or dichloromethane would improve a diffusion rate of the solvents through the membrane, such concentration helps form better porous structure. The reason as below: too high a concentration of water or dichloromethane would make the porous membrane to form a compact layer, which increases an air permeation time. Meanwhile, too low a concentration of water or dichloromethane would make the casting slurry hard to cure and form a membrane. On the other hand, the temperature of the coagulation bath would facilitate the solvent of the membrane to spread in the coagulation bath quickly, and would form a better porous structure. Under the premise of selecting suitable concentration of water or dichloromethane in the present disclosure, too low a temperature of the coagulation bath would make the solvent inside membrane to spread very slowly to the coagulation bath, because of this, the yielded membrane would have a low porosity and small aperture; on the contrary, too high a temperature would make the membrane to form finger-like pores internally, and lead to an over-high porosity. In conclusion, the temperature of the coagulation bath and the concentration of the components in the coagulation bath both play important roles on the formation of the excellent porous membrane, especially, the cooperation of both would achieve a better porous membrane.

In one embodiment, a time for the mixed solution to form a membrane in the coagulation bath is 5-300 seconds. In another embodiment, the time for the mixed solution to form a membrane in the coagulation bath is 10-200 seconds.

In one embodiment, the extractant is at least one selected from water, dichloromethane, trichloromethane, and ethanol. In another embodiment, a temperature of the extractant is 20-100° C. In yet another embodiment, the temperature of the extractant is 30-80° C.

In one embodiment, a method for preparing an aromatic polyamide porous membrane includes the following: mixing an ionic liquid and an aromatic polyamide into a solvent to form a mixed solution; the mixed solution outflowing through a slit to form a membrane in coagulation bath; extracting the membrane with an extractant to remove the ionic liquid and the solvent in an extraction tank, and forming a porous membrane; and drying the porous membrane to yield an aromatic polyamide porous membrane.

In the present disclosure, said "the mixed solution outflowing through a slit" means to make the mixed solution to form thin-film via a slit. Along with this, any mold that could form slit shape would be applied in the invention. In one embodiment, the slit is formed by a scraper, and the mixed solution flows out through the slit to form a thin-film. In another embodiment, the slit is formed by an extrusion die, and the mixed solution flows out through the slit to form a thin-film.

In one embodiment, the "drying" refers to infra-red drying and/or air-blow drying.

In one embodiment, a drying temperature is 50-150° C. In another embodiment, the drying temperature is 80-120° C.

The present disclosure also provides an aromatic polyamide porous membrane, which is prepared by the methods above.

Meanwhile, the present disclosure still provides a lithium ion secondary battery, which includes the aromatic polyamide porous membrane prepared above.

To make the above-mentioned purposes, characteristics, and advantages more apparent and understandable, detailed description accompanying preferred embodiments are given below.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

Figure 1:
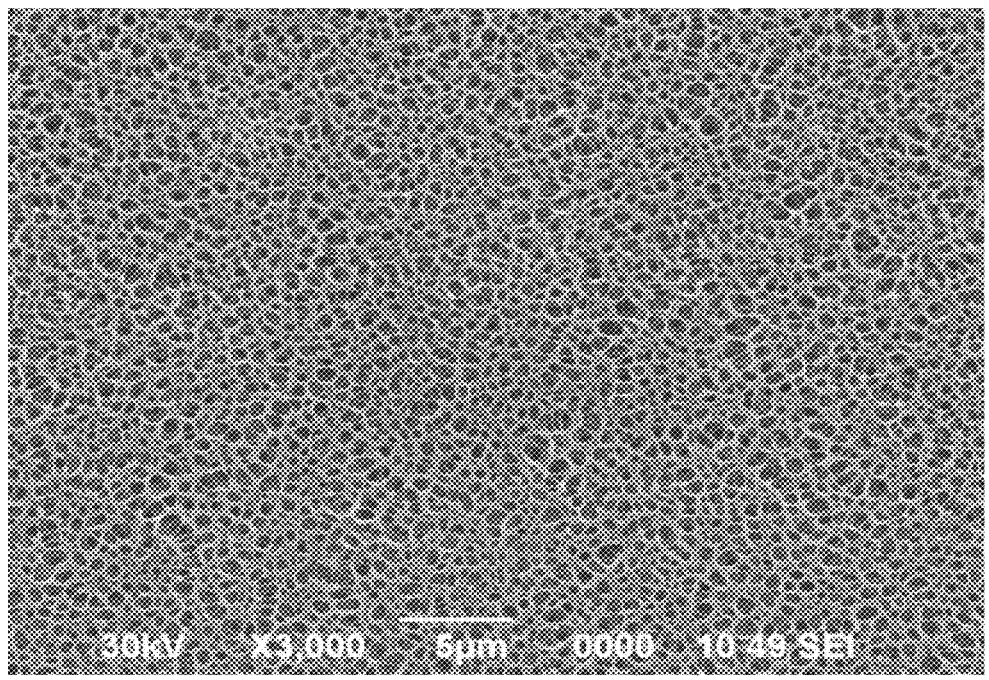
FIG. 1 shows an SEM photograph of surfaces of the aromatic polyamide porous membrane prepared in embodiment 1.
Figure 2:
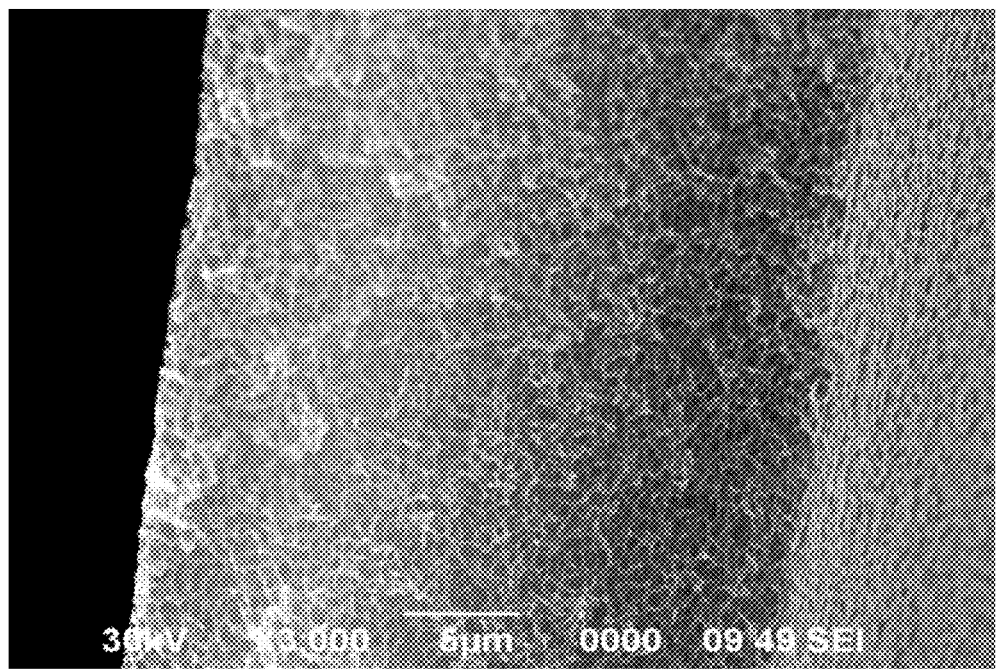
FIG. 2 shows an SEM photograph of a cross-section of the aromatic polyamide porous membrane prepared in embodiment 1.

First, polymerizing in a reaction tank to obtain a poly (m-phenylene isophthalamide) solution 2000 g, wherein DMAC acting as the solvent, and a mass percentage concentration of the polymer is 20%. Second, mixing 800 g of 1-methyl-3-butyl imidazolinium hydrochloride with 240 g of anhydrous ethanol in a stirred tank to obtain an ionic liquid solution. Third, injecting the ionic liquid solution and the poly (m-phenylene isophthalamide) solution into a twin-screw extruder at a mass ratio of 1:1.8, and mixing dispersively therein to obtain a uniform mixture. After that, extruding the uniform mixture at a die-head by a melt pump into a coagulation bath to obtain a thin-film, wherein the coagulation bath being a mixed solvents of water and DMAC, a mass fraction of water is 50%, a temperature of the coagulation bath being 80° C. and a gel time thereof being 20 seconds. Next, pulling the thin-film into an extraction tank, wherein a temperature of the extraction tank being 30° C. And then, extracting with dichloromethane to remove the solvents, and forming a porous-structured membrane. Finally, the porous-structured membrane undergoing a hot air drying, wherein a drying temperature being 80° C. Rewinding after removing static to yield the aromatic polyamide porous membrane. FIG. 1 shows an SEM photograph of surfaces of the aromatic polyamide porous membrane prepared in embodiment 1. As shown in FIG. 1, the surfaces of the aromatic polyamide porous membrane prepared in embodiment 1 have no dense layer surface, meanwhile, the surfaces thereof have uniform pore distribution. FIG.2 shows an SEM photograph of a cross-section of the aromatic polyamide porous membrane prepared in embodiment 1. As shown in FIG. 2, there are spongy-like porous structure existed inside the membrane, meanwhile, the pore distribution therein is also uniform. A permeability of the porous membrane is 80 sec./100 CC.

Embodiment 2

First, polymerizing by twin-screw to obtain a poly (m-phenylene isophthalamide) solution 2400 g, wherein DMAC acting as a solvent, and a mass percentage concentration of the polymer is 20%. Second, mixing 1000 g of methyl triethylammonium acetate and 200 g of deionized water uniformly in a stirred tank to obtain an ionic liquid solution, wherein the stirred tank being heated to 50° C. Third, injecting the obtained ionic liquid solution and the poly (m-phenylene isophthalamide) solution separately into a twin-screw extruder at a mass ratio of 1:1.5, and mixing dispersively therein to obtain a uniform mixture. After that, extruding the uniform mixture at a die-head by a melt pump into a coagulation bath to obtain a thin-film, wherein the coagulation bath being a mixed solvents of water and DMAC, a mass fraction of water in the coagulation bath is 20%, a temperature of the coagulation bath being 60° C. and a gel time thereof being 5 seconds. Next, pulling the thin-film into an extraction tank, wherein a temperature of the extraction tank being 80° C. And then, extracting with water to remove the solvents, and forming a porous-structured membrane. Finally, the porous-structured membrane undergoing an infra-red drying, wherein a drying temperature being 120° C. Rewinding after removing static to yield the aromatic polyamide porous membrane. A permeability of the porous membrane is 105 sec./100 CC.

Embodiment 3

Embodiment 3 is similar with embodiment 2, and the difference lies in that, a mass of deionized water which is mixed with methyl triethylammonium acetate is 50 g, and the permeability of the porous membrane is 110 sec./100 CC.

Embodiment 4

Embodiment 4 is similar with embodiment 2, and the difference lies in that, the coagulation bath is water, the temperature of the coagulation bath is 80° C., and the gel time thereof is 20 seconds, the drying temperature of the infra-red drying is 150° C., and the permeability of the porous membrane is 820 sec./100 CC.

Embodiment 5

First, polymerizing in a reaction kettle to obtain a 1600 g solution of p-benzamide and polysulfone amide, wherein NMP acting as a solvent, and the mass percentage concentration of polymer being 9%. Second, mixing 800 g of 1-methyl-3-propyl imidazolium acetate and 160 g of ethyl acetate uniformly in a stirred tank to obtain an ionic liquid solution. Third, injecting the obtained ionic liquid solution and the solution of p-benzamide and polysulfone amide separately into a mixing tank at a mass ratio of 1:1.6, and mixing uniformly therein under negative pressure to obtain a uniform mixture. After that, extruding the uniform mixture at a die-head by a melt pump into a coagulation bath to obtain a thin-film, wherein the coagulation bath being a mixed solvents of water and NMP, a mass fraction of water in the coagulation bath is 20%, a temperature of the coagulation bath being 50° C. and a gel time thereof being 80 seconds. Next, pulling the thin-film into an extraction tank, wherein a temperature of the extraction tank being 80° C. And then, extracting with water to remove the solvents, and forming a porous-structured membrane. Finally, the porous-structured membrane undergoing an infra-red drying, wherein a drying temperature being 120° C. Rewinding after removing static to yield the aromatic polyamide porous membrane. A permeability of the porous membrane is 40 sec./100 CC.

Embodiment 6

Embodiment 6 is similar to embodiment 5, and the difference lies in that the temperature of the extraction tank is 100° C.

Embodiment 7

First, polymerizing in a reaction kettle to obtain a poly (p-phenylene terephthalamide) solution 2000 g, wherein DMF acting as a solvent, and the polymer mass percentage concentration being 18%. Second, mixing 800 g of N-methyl-N-propyl pyrrolidone fluoroborate and 100 g of dichloromethane in a stirred tank uniformly to obtain an ionic liquid solution, wherein the stirred tank being heated to 50° C. Third, injecting the obtained ionic liquid solution and the poly(p-phenylene terephthalamide) solution separately into a tri-screw extruder at a mass ratio of 1:1.3, and mixing dispersively therein to obtain a uniform mixture. After that, extruding the uniform mixture at a die-head by a melt pump into a coagulation bath to obtain a thin-film, wherein the coagulation bath being a mixed solvents of dichloromethane and DMF, a mass ratio of dichloromethane in the coagulation bath being 30%, a temperature of the coagulation bath being 20° C. and a gel time thereof being 150 seconds. Next, pulling the thin-film into an extraction tank, wherein a temperature of the extraction tank being 30° C. And then, extracting with dichloromethane to remove the solvents, and forming a porous structured membrane. Finally, the porous-structured membrane undergoing an air-blow drying, wherein a drying temperature being 80° C. Rewinding after removing static to yield the aromatic polyamide porous membrane. A permeability of the porous membrane is 180 sec./100 CC.

Embodiment 8

First, dissolving 200 g of poly (m-phenylene isophthalamide) spun into 1200 g of DMAC solvent to obtain a polymer solution, wherein a mass percentage concentration of the polymer being 16.7%. Second, mixing 600 g of methyl tri-butyl ammonium hydrochloride with 150 g of deionized water in a stirred tank to obtain an ionic liquid solution, wherein the stirred tank being heated to 50° C. Third, injecting the obtained ionic liquid solution and the poly (m-phenylene isophthalamide) solution separately into a tri-screw extruder at a mass ratio of 1:1.4, and mixing dispersively therein to obtain a uniform mixture. After that, extruding the uniform mixture at a die-head by a melt pump into a coagulation bath to obtain a thin-film, wherein the coagulation bath being a mixed solvents of water and DMAC, a mass fraction of water in the coagulation bath is 30%, a temperature of the coagulation bath being 50° C. and a gel time thereof being 80 seconds. Next, pulling the thin-film into an extraction tank, wherein a temperature of the extraction tank being 80° C. And then, extracting with water to remove the solvents, and forming a porous structured membrane. Finally, the porous-structured membrane undergoing an infra-red drying, wherein a drying temperature being 120° C. Rewinding after removing static to yield the aromatic polyamide porous membrane. A permeability of the porous membrane is 86 sec./100 CC.

Embodiment 9

First, dissolving 180 g of p-benzamide and polysulfone amide spun into 1000 g of DMAC solvent to obtain a polymer solution, wherein a mass percentage concentration of the polymer being 33.3%. Second, mixing 400 g of methyl tri-n-butyl phosphonium hydrochloride with 320 g of dichloromethane in a stirred tank to obtain an ionic liquid solution. Third, injecting the obtained ionic liquid solution and the p-benzamide and polysulfone amide spun polymer solution separately into a mixing tank at a mass ratio of 1:1.6, and stirring uniformly therein under negative pressure to obtain a uniform mixture. After that, extruding the uniform mixture at a die-head by a melt pump into a coagulation bath to obtain a thin-film, wherein the coagulation bath being a mixed solvents of DMAC and dichloromethane, a mass ratio of dichloromethane in the coagulation bath being 30%, a temperature of the coagulation bath being 0° C. and a gel time thereof being 250 seconds. Next, pulling the thin-film into an extraction tank, wherein a temperature of the extraction tank being 30° C. And then, extracting with dichloromethane to remove the solvents, and forming a porous structured membrane. Finally, the porous-structured membrane undergoing an air-blow drying, wherein a drying temperature being 50° C. Rewinding after removing static to yield the aromatic polyamide porous membrane. A permeability of the porous membrane is 380 sec./100 CC.

Embodiment 10

Embodiment 10 is similar with embodiment 1, and their difference lies in that the coagulation bath is dichloromethane, the temperature of the extraction tank is 30° C., and the permeability of the porous membrane is 330 sec./100 CC.

Embodiment 11

First, mixing 300 g of methyl tri-butyl ammonium hydrochloride with 1200 g of DMAC uniformly to form a first mixed solution. Second, adding 200 g of p-benzamide and polysulfone amide spun into the first mixed solution above, heating to 80° C., and stirring uniformly under negative pressure to form a second mixed solution. Third, extruding the obtained second mixed solution at a die-head by a melt pump into a coagulation bath to obtain a thin-film, wherein the coagulation bath being a mixed solvents of DMAC and dichloromethane, a mass ratio of dichloromethane in the coagulation bath being 20%, a temperature of the coagulation bath being 40° C. and a gel time thereof being 180 seconds. Next, pulling the thin-film into an extraction tank, wherein a temperature of the extraction tank being 30° C. And then, extracting with dichloromethane to remove the solvents, and forming a porous structured membrane. Finally, the porous-structured membrane undergoing an air-blow drying, wherein a drying temperature being 60° C. Rewinding after removing static to yield the aromatic polyamide porous membrane. A permeability of the porous membrane is 120 sec./100 CC.

Embodiment 12

First, mixing 250 g of 1-methyl-3-butyl imidazolinium hydrochloride with 1500 g of DMAC uniformly to form a first mixed solution. Second, adding 125 g of poly (m-phenylene isophthalamide) spun into the first mixed solution above, heating to 80° C., and stirring uniformly under negative pressure to form a second mixed solution. Third, extruding the obtained second mixed solution at a die-head by a melt pump into a coagulation bath to obtain a thin-film, wherein the coagulation bath being a mixed solvents of DMAC and water, and a mass fraction of water in the coagulation bath being 20%, a temperature of the coagulation bath being 50° C. and a gel time thereof being 30 seconds. Next, pulling the thin-film into the extraction tank, wherein a temperature of the extraction tank being 80° C. And then, extracting with water to remove the solvents, and forming a porous structured membrane. Finally, the porous-structured membrane undergoing an air-blow drying, wherein a drying temperature being 120° C. Rewinding after removing static to yield the aromatic polyamide porous membrane. A permeability of the porous membrane is 50 sec./100 CC.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

INDUSTRIAL APPLICABILITY

In the present disclosure, a porous membrane is prepared by a nonsolvent induced phase separation (NIPS) process. Compared with thermally induced phase separation (TIPS), NIPS process doesn't require higher temperature during the whole process, and its process parameters are easier to be controlled. Further, three-dimensional mesh pore structures can be easier to be yielded in NIPS process. For the reasons above, NIPS process is widely applied in current porous membrane industries such as water treatment membrane, air separation membrane etc. In the present disclosure, aromatic polyamide porous membranes are prepared under the following factors which cooperate with each other: using NIPS process and choosing ionic liquids as a pore-forming agent. The prepared aromatic polyamide porous membranes act as a diaphragm of the lithium battery.

What is claimed is:

1. A method for preparing an aromatic polyamide porous membrane, comprising the following steps:

mixing an ionic liquid with an aromatic polyamide into a solvent to form a mixed solution;

the mixed solution forming a membrane in a coagulation bath; and extracting with an extractant to remove the solvent and the ionic liquid from the membrane to yield a porous membrane;

wherein the coagulation bath comprises a first component; and the first component is dichloromethane, the coagulation bath further comprises a second component that is at least one selected from the group consisting of N-methyl pyrrolidone, N,N-dimethyl acetamide, N,N-dimethyl formamide, dimethyl sulfoxide and triethyl phosphate, and a mass fraction of dichloromethane in the coagulation bath is 5-99.9%, 20-60%, or 30-50%; and a mass ratio of the ionic liquid to the aromatic polyamide is between 1:1 and 8:1, or between 1:1 and 6:1; or between 2:1 and 5:1; a temperature of the coagulation bath is 0-80° C. or 20-60° C., and a time for the mixed solution to form a membrane in the coagulation bath is 5-300 seconds or 10-200 seconds.

2. The method of claim 1, wherein the ionic liquid is at least one selected from the group consisting of quaternary ammonium salt, quaternary phosphonium salt, imidazolium onium salt, pyridinium onium salt, piperidinium salt and pyrrolidine salt; and/or the aromatic polyamide is at least one selected from the group consisting of poly(p-phenylene terephthalamide), poly(m-phenylene isophthalamide), poly (p-benzamide) and polysulfone amide.

3. The method of claim 1, wherein mixing an ionic liquid with aromatic polyamide into a solvent to form a mixed solution is implemented by one of the following methods:

1) mixing an ionic liquid with a first solvent to form an ionic liquid solution; mixing an aromatic polyamide with a second solvent to form an aromatic polyamide solution; and mixing the ionic liquid solution with the aromatic polyamide solution to obtain the mixed solution; or 2) mixing an ionic liquid with a first solvent to form an ionic liquid solution; forming an aromatic polyamide solution by polymerization, wherein a second solvent is applied in the polymerization; and mixing the ionic liquid solution with the aromatic polyamide solution to obtain the mixed solution; or 3) mixing an ionic liquid, an aromatic polyamide and a third solvent to obtain the mixed solution.

4. The method of claim 3, wherein the aromatic polyamide is aromatic polyamide fiber.

5. The method of claim 3, wherein the first solvent is at least one selected from the group consisting of water, ethanol, propanol, isopropanol, glycerol, tetrahydrofuran, pyridine, dichloromethane, trichloromethane, ethyl acetate, N,N-dimethyl formamide, N,N-dimethyl acetamide, N-methyl pyrrolidone and polyethylene glycol.

6. The method of claim 3, wherein the second solvent is at least one selected from the following: N-methyl pyrrolidone, N,N-dimethyl acetamide, N,N-dimethyl formamide, dimethyl sulfoxide and tri-ethyl phosphate.

7. The method of claim 3, wherein a mass ratio of the first solvent to the ionic liquid is between 0.05:1 and 0.8:1, or between 0.1:1 and 0.5:1.

8. The method of claim 3, wherein a mass ratio of the second solvent to the aromatic polyamide is between 2:1 and 10:1, or between 3:1 and 8:1.

9. The method of claim 3, wherein the third solvent is at least one selected from the following: N-methyl pyrrolidone, N,N-dimethyl acetamide, N,N-dimethyl formamide and dimethyl sulfoxide.

10. The method of claim 3, wherein a mass fraction of the third solvent in the mixed solution is 20-80%, or 40-70%.

11. The method of claim 1, wherein the extractant is at least one selected from water, dichloromethane, trichloromethane and ethanol; and/or a temperature of the extractant is 20-100° C. or 30-80° C.

12. The method of claim 1, comprising: mixing an ionic liquid and an aromatic polyamide into a solvent to form a mixed solution; the mixed solution outflowing through a slit to form a membrane in a coagulation bath; extracting the membrane with an extractant to remove the ionic liquid and the solvent in the extraction tank and forming a porous membrane; and drying the porous membrane to yield an aromatic polyamide porous membrane.

13. The method of claim 12, wherein the slit is formed by a scraper or an extrusion die-head.

14. The method of claim 12, wherein the drying is infra-red drying and/or air-blow drying; and/or a drying temperature is 50-150° C. or 80-120° C.

15. An aromatic polyamide porous membrane prepared by a method as described in claim 1.

16. A lithium ion secondary battery, comprising the aromatic polyamide porous membrane of claim 15.

* * * * *